(12) United States Patent
Dewanjee

(10) Patent No.: US 7,101,952 B2
(45) Date of Patent: Sep. 5, 2006

(54) POLYURETHANE MATERIAL FOR A GOLF BALL COVER

(75) Inventor: Pijush K. Dewanjee, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 76 days.

(21) Appl. No.: 10/904,981

(22) Filed: Dec. 8, 2004

(65) Prior Publication Data

US 2006/0122009 A1  Jun. 8, 2006

(51) Int. Cl.
C08G 18/10 (2006.01)

(52) U.S. Cl. .................. 528/64; 473/373; 473/374; 473/377; 473/378

(58) Field of Classification Search ............... 528/64; 473/373, 374, 377, 378
See application file for complete search history.

(56) References Cited

U.S. PATENT DOCUMENTS

| | | |
|---|---|---|
| 721,462 A | 2/1903 | Richards |
| 2,002,726 A | 5/1935 | Young |
| 2,940,128 A | 6/1960 | Bowerman et al. |
| 3,034,791 A | 5/1962 | Gallagher |
| 3,112,521 A | 12/1963 | Ward |
| 3,130,102 A | 4/1964 | Watson et al. |
| 3,147,324 A | 9/1964 | Ward |
| 3,177,280 A | 4/1965 | Ford et al. |
| 3,227,456 A | 1/1966 | Sonneman |
| 3,616,101 A | 10/1971 | Satchell et al. |
| 3,979,126 A | 9/1976 | Dusbiber |
| 3,989,568 A | 11/1976 | Isaac |
| 4,062,825 A | 12/1977 | Watabe et al. |
| 4,090,716 A | 5/1978 | Martin et al. |
| 4,123,061 A | 10/1978 | Dusbiber |
| 4,203,941 A | 5/1980 | Brooker |
| 4,248,432 A | 2/1981 | Hewitt et al. |
| 4,250,273 A | 2/1981 | Bohm et al. |
| 4,266,773 A | 5/1981 | Treadwell |
| 4,274,637 A | 6/1981 | Molitor |
| 4,321,183 A | 3/1982 | Cox et al. |
| 4,349,657 A | 9/1982 | Holloway |
| 4,431,193 A | 2/1984 | Nesbitt |
| 4,442,282 A | 4/1984 | Kolycheck |
| 4,631,298 A | 12/1986 | Presswood |
| 4,650,193 A | 3/1987 | Molitor et al. |
| 4,674,170 A | 6/1987 | Hubbert et al. |
| 4,674,751 A | 6/1987 | Molitor et al. |
| 4,787,638 A | 11/1988 | Kobayashi |
| 4,830,378 A | 5/1989 | Aoyama |
| 4,836,552 A | 6/1989 | Puckett et al. |
| 4,870,142 A | 9/1989 | Czerwinski et al. |
| 5,006,297 A | 4/1991 | Brown |
| 5,033,750 A | 7/1991 | Yamagishi et al. |
| 5,062,644 A | 11/1991 | Lee |
| 5,098,105 A | 3/1992 | Sullivan |
| 5,112,556 A | 5/1992 | Miller |
| 5,143,377 A | 9/1992 | Oka et al. |
| 5,159,053 A | 10/1992 | Kolycheck et al. |
| 5,184,828 A | 2/1993 | Kim et al. |
| 5,209,485 A | 5/1993 | Nesbitt et al. |
| 5,308,076 A | 5/1994 | Sun |
| 5,334,673 A | 8/1994 | Wu |
| 5,338,039 A | 8/1994 | Oka et al. |
| 5,356,150 A | 10/1994 | Lavelle et al. |
| 5,368,304 A | 11/1994 | Sullivan et al. |
| 5,377,989 A | 1/1995 | Machin |
| 5,441,276 A | 8/1995 | Lim |
| 5,470,076 A | 11/1995 | Cadorniga |
| 5,484,870 A | 1/1996 | Wu |
| 5,536,013 A | 7/1996 | Pocklingtion |
| 5,575,477 A | 11/1996 | Hwang |
| 5,682,230 A | 10/1997 | Anfinsen et al. |
| 5,688,191 A | 11/1997 | Cavallaro et al. |
| 5,692,974 A | 12/1997 | Wu et al. |
| 5,703,193 A | 12/1997 | Rosenberg et al. |
| 5,714,546 A | 2/1998 | Egashira |
| 5,722,903 A | 3/1998 | Moriyama et al. |
| 5,733,428 A | 3/1998 | Calabria et al. |
| 5,779,562 A | 7/1998 | Melvin et al. |
| 5,792,008 A | 8/1998 | Kakiuchi et al. |
| 5,797,808 A | 8/1998 | Hayashi et al. |
| 5,803,831 A | 9/1998 | Sullivan et al. |
| 5,803,834 A | 9/1998 | Yamagishi et al. |
| 5,813,923 A | 9/1998 | Caballero et al. |
| 5,816,937 A | 10/1998 | Shimosaka et al. |
| 5,816,940 A | 10/1998 | Hayashi et al. |
| 5,824,746 A | 10/1998 | Harris et al. |
| 5,830,085 A | 11/1998 | Higuchi et al. |
| 5,830,087 A | 11/1998 | Sullivan et al. |
| 5,857,924 A | 1/1999 | Miyagawa et al. |
| 5,863,264 A | 1/1999 | Yamagishi et al. |
| D406,623 S | 3/1999 | Steifel |
| 5,885,172 A | 3/1999 | Hebert et al. |
| 5,888,437 A | 3/1999 | Calabria et al. |
| 5,890,975 A | 4/1999 | Steifel |

(Continued)

*Primary Examiner*—Rachel Gorr
(74) *Attorney, Agent, or Firm*—Michael A. Catania; Elaine H. Lo

(57) ABSTRACT

A curative blend for a thermosetting polyurethane material that allows for a polyurethane material with greater durability is disclosed herein. The curative blend is composed of a diethyl-2,4-toluene-diamine and a second curing agent. A preferred polyurethane prepolymer is a polytetramethylene ether glycol terminated 4,4'-dicyclohexyl methane diisocyanate polyurethane prepolymer. The thermosetting polyurethane is preferably utilized as a cover for a golf ball. The cover is preferably formed over a core and boundary layer.

11 Claims, 1 Drawing Sheet

U.S. PATENT DOCUMENTS

| | | | |
|---|---|---|---|
| 5,897,884 A | 4/1999 | Calabria et al. | |
| 5,899,822 A | 5/1999 | Yamagishi et al. | |
| 5,906,551 A | 5/1999 | Kasashima et al. | |
| 5,908,358 A | 6/1999 | Wu | |
| 5,908,359 A | 6/1999 | Shimosaka et al. | |
| 5,916,044 A | 6/1999 | Shimosaka et al. | |
| 5,929,189 A | 7/1999 | Ichikawa et al. | |
| 5,935,021 A | 8/1999 | Kashiwagi et al. | |
| 5,935,023 A | 8/1999 | Machara et al. | |
| 5,947,843 A | 9/1999 | Caballaro et al. | |
| 5,961,401 A | 10/1999 | Matsutani et al. | |
| 5,965,669 A | 10/1999 | Cavallaro et al. | |
| 5,971,870 A | 10/1999 | Sullivan et al. | |
| 5,971,871 A | 10/1999 | Sullivan et al. | |
| 5,981,658 A | 11/1999 | Rajagopalan et al. | |
| 5,984,806 A | 11/1999 | Sullivan et al. | |
| 5,993,968 A | 11/1999 | Umazawa et al. | |
| 6,015,356 A | 1/2000 | Sullivan et al. | |
| 6,037,419 A | 3/2000 | Takesue et al. | |
| 6,042,488 A | 3/2000 | Sullivan et al. | |
| 6,042,768 A | 3/2000 | Calabria et al. | |
| 6,054,550 A | 4/2000 | Umazawa et al. | |
| 6,057,403 A | 5/2000 | Sullivan et al. | |
| 6,126,558 A | 10/2000 | Higuchi et al. | |
| 6,213,892 B1 | 4/2001 | Felker et al. | |
| 6,290,615 B1 | 9/2001 | Ogg | |
| D449,358 S | 10/2001 | Ogg | |
| 6,309,313 B1 | 10/2001 | Peter | |
| 6,435,986 B1 | 8/2002 | Wu et al. | |
| 6,476,176 B1 | 11/2002 | Wu | |
| 6,486,261 B1 | 11/2002 | Wu et al. | |
| 6,506,851 B1 | 1/2003 | Wu | |
| 6,518,358 B1 | 2/2003 | Wu | |
| 6,528,578 B1 | 3/2003 | Wu | |
| 6,610,812 B1 | 8/2003 | Wu et al. | |
| 6,645,088 B1 | 11/2003 | Wu et al. | |
| 6,645,091 B1 | 11/2003 | Wu et al. | |
| 6,737,498 B1 | 5/2004 | Harris et al. | |
| 6,933,336 B1 * | 8/2005 | Yokota | 524/108 |

* cited by examiner

POLYURETHANE MATERIAL FOR A GOLF BALL COVER

BACKGROUND OF THE INVENTION

1. Field of the Invention

The present invention relates to a thermosetting polyurethane material. More specifically, the present invention relates to a thermosetting polyurethane material for a cover of a golf ball.

2. Description of the Related Art

Conventionally golf balls are made by molding a cover around a core. The core may be wound or solid. A wound core typically comprises elastic thread wound about a solid or liquid center. Unlike wound cores, solid cores do not include a wound elastic thread layer. Solid cores typically may comprise a single solid piece center or a solid center covered by one or more mantle or boundary layers of material.

The cover may be injection molded, compression molded, or cast over the core. Injection molding typically requires a mold having at least one pair of mold cavities, e.g., a first mold cavity and a second mold cavity, which mate to form a spherical recess. In addition, a mold may include more than one mold cavity pair.

In one exemplary injection molding process each mold cavity may also include retractable positioning pins to hold the core in the spherical center of the mold cavity pair. Once the core is positioned in the first mold cavity, the respective second mold cavity is mated to the first to close the mold. A cover material is then injected into the closed mold. The positioning pins are retracted while the cover material is flowable to allow the material to fill in any holes caused by the pins. When the material is at least partially cured, the covered core is removed from the mold.

As with injection molding, compression molds typically include multiple pairs of mold cavities, each pair comprising first and second mold cavities that mate to form a spherical recess. In one exemplary compression molding process, a cover material is pre-formed into half-shells, which are placed into a respective pair of compression mold cavities. The core is placed between the cover material half-shells and the mold is closed. The core and cover combination is then exposed to heat and pressure, which cause the cover half-shells to combine and form a full cover.

As with the above-referenced processes, a casting process also utilizes pairs of mold cavities. In a casting process, a cover material is introduced into a first mold cavity of each pair. Then, a core is held in position (e.g. by an overhanging vacuum or suction apparatus) to contact the cover material in what will be the spherical center of the mold cavity pair. Once the cover material is at least partially cured (e.g., a point where the core will not substantially move), the core is released, the cover material is introduced into a second mold cavity of each pair, and the mold is closed. The closed mold is then subjected to heat and pressure to cure the cover material thereby forming a cover on the core. With injection molding, compression molding, and casting, the molding cavities typically include a negative dimple pattern to impart a dimple pattern on the cover during the molding process.

Materials previously used as golf ball covers include balata (natural or synthetic), gutta-percha, ionomeric resins (e.g., DuPont's SURLYN®), and polyurethanes. Balata is the benchmark cover material with respect to sound (i.e. the sound made when the ball is hit by a golf club) and feel (i.e. the sensation imparted to the golfer when hitting the ball). Natural balata is derived from the Bully Gum tree, while synthetic balata is derived from a petroleum compound. Balata is expensive compared to other cover materials, and golf balls covered with balata tend to have poor durability (i.e. poor cut and shear resistance). Gutta percha is derived from the Malaysian sapodilla tree. A golf ball covered with gutta percha is considered to have a harsh sound and feel as compared to balata covered golf balls.

Ionomeric resins, as compared to balata, are typically less expensive and tend to have good durability. However, golf balls having ionomeric resin covers typically have inferior sound and feel, especially as compared to balata covers.

A golf ball with a polyurethane cover generally has greater durability than a golf ball with a balata cover. The polyurethane covered golf ball generally has a better sound and feel than a golf ball with an ionomeric resin cover. Polyurethanes may be thermoset or thermoplastic. Polyurethanes are formed by reacting a prepolymer with a polyfunctional curing agent, such as a polyamine or a polyol. The polyurethane prepolymer is the reaction product of, for example, a diisocyanate and a polyol such as a polyether or a polyester. Several patents describe the use of polyurethanes in golf balls. However, golf balls with polyurethane covers usually do not have the distance of other golf balls such as those with covers composed of SURLYN® materials.

Gallagher, U.S. Pat. No. 3,034,791 discloses a polyurethane golf ball cover prepared from the reaction product of poly(tetramethylene ether) glycol and toluene-2,4-diisocyanates (TDI), either pure TDI or an isomeric mixture.

Isaac, U.S. Pat. No. 3,989,568 ("the '568 patent) discloses a polyurethane golf ball cover prepared from prepolymers and curing agents that have different rates of reaction so a partial cure can be made. The '568 patent explains that "the minimum number of reactants is three." Specifically, in '568 patent, two or more polyurethane prepolymers are reacted with at least one curing agent, or at least one polyurethane prepolymer is reacted with two or more curing agents as long as the curing agents have different rates of reaction. The '568 patent also explains that "[o]ne of the great advantages of polyurethane covers made in accordance with the instant invention is that they may be made very thin . . . ", and "[t]here is no limitation on how thick the cover of the present invention may be but it is generally preferred . . . that the cover is no more than about 0.6 inches in thickness." The examples in the '568 patent only disclose golf balls having covers that are about 0.025 inches thick.

Similar to Isaac, PCT International Publication Number WO 99/43394 to Dunlop Maxfli Sports Corporation, discloses using two curing agents to control the reaction time for polyurethane formation. The two curing agents are a dimethylthio 2,4-toluenediamine and diethyl 2,4-toluenediamine, which are blended to control the reaction rate of a toluene diisocyanate based polyurethane prepolymer or a 4,4'-diphenylmethane diisocyanate based polyurethane prepolymer.

Dusbiber, U.S. Pat. No. 4,123,061 ("the '061 patent") discloses a polyurethane golf ball cover prepared from the reaction product of a polyether, a diisocyanate and a curing agent. The '061 patent discloses that the polyether may be polyalkylene ether glycol or polytetramethylene ether glycol. The '061 patent also discloses that the diisocyanate may be TDI, 4,4'-diphenylmethane diisocyanate ("MDI"), and 3,3'-dimethyl-4,4'-biphenylene diisocyanate ("TODI"). Additionally, the '061 patent discloses that the curing agent may be either a polyol (either tri- or tetra-functional and not di-functional) such as triisopropanol amine ("TIPA") or trimethoylol propane ("TMP", or an amine-type having at least two reactive amine groups such as: 3,3' dichlorobenzidene; 3,3' dichloro 4,4' diamino diphenyl methane ("MOCA"; N,N,N',N' tetrakis (2-hydroxy propyl) ethylene diamine; or Uniroyal's Curalon L which is an aromatic diamine mixture.

Hewitt, et al., U.S. Pat. No. 4,248,432 ("the '432 patent") discloses a thermoplastic polyesterurethane golf ball cover formed from a reaction product of a polyester glycol (molecular weight of 800–1500) (aliphatic diol and an aliphatic dicarboxylic acid) with a para-phenylene diisocyanate ("PPDI" or cyclohexane diisocyanate in the substantial absence of curing or crosslinking agents. The '432 patent teaches against the use of chain extenders in making polyurethanes. The '432 patent states, "when small amounts of butanediol-1,4 are mixed with a polyester . . . the addition results in polyurethanes that do not have the desired balance of properties to provide good golf ball covers. Similarly, the use of curing or crosslinking agents is not desired . . . ."

Holloway, U.S. Pat. No. 4,349,657 ("the '657 patent") discloses a method for preparing polyester urethanes with PPDI by reacting a polyester (e.g. prepared from aliphatic glycols having 2–8 carbons reacted with aliphatic dicarboxylic acids having 4–10 carbons) with a molar excess of PPDI to obtain an isocyanate-terminated polyester urethane (in liquid form and stable at reaction temperatures), and then reacting the polyester urethane with additional polyester. The '657 patent claims that the benefit of this new process is the fact that a continuous commercial process is possible without stability problems. The '657 patent further describes a suitable use for the resultant material to be golf ball covers.

Wu, U.S. Pat. No. 5,334,673 ("the '673 patent") discloses a polyurethane prepolymer cured with a slow-reacting curing agent selected from slow-reacting polyamine curing agents and difunctional glycols (i.e., 3,5-dimethylthio-2,4-toluenediamine, 3,5-dimethylthio-2,6-toluenediamine, N,N'-dialkyldiamino diphenyl methane, trimethyleneglycol-di-p-aminobenzoate, polytetramethyleneoxide-di-p-aminobenzoate, 1,4-butanediol, 2,3-butanediol, 2,3-dimethyl-2,3-butanediol, ethylene glycol, and mixtures of the same). The polyurethane prepolymer in the '673 patent is disclosed as made from a polyol (e.g., polyether, polyester, or polylactone) and a diisocyanate such as MDI or TODI. The polyether polyols disclosed in the '673 patent are polytetramethylene ether glycol, poly(oxypropylene) glycol, and polybutadiene glycol. The polyester polyols disclosed in the '673 patent are polyethylene adipate glycol, polyethylene propylene adipate glycol, and polybutylene adipate glycol. The polylactone polyols disclosed in the '673 patent are diethylene glycol initiated caprolactone, 1,4-butanediol initiated caprolactone, trimethylol propane initiated caprolactone, and neopentyl glycol initiated caprolactone.

Cavallaro, et al., U.S. Pat. No. 5,688,191 discloses a golf ball having core, mantle layer and cover, wherein the mantle layer is either a vulcanized thermoplastic elastomer, functionalized styrene-butadiene elastomer, thermoplastic polyurethane, metallocene polymer or blends of the same and thermoset materials.

Wu, et al., U.S. Pat. No. 5,692,974 discloses golf balls having covers and cores that incorporate urethane ionomers (i.e. using an alkylating agent to introduce ionic interactions in the polyurethane and thereby produce cationic type ionomers).

Sullivan, et al., U.S. Pat. No. 5,803,831 ("the '831 patent") discloses a golf ball having a multi-layer cover wherein the inner cover layer has a hardness of at least 65 Shore D and the outer cover layer has a hardness of 55 Shore D or less, and more preferably 48 Shore D or less. The '831 patent explains that this dual layer construction provides a golf ball having soft feel and high spin on short shots, and good distance and average spin on long shots. The '831 patent provides that the inner cover layer can be made from high or low acid ionomers such as SURLYN®, ESCOR® or IOTEK®, or blends of the same, nonionomeric thermoplastic material such as metallocene catalyzed polyolefins or polyamides, polyamide/ionomer blends, polyphenylene ether/ionomer blends, etc., (having a Shore D hardness of at least 60 and a flex modulus of more than 30000 psi), thermoplastic or thermosetting polyurethanes, polyester elastomers (e.g. HYTREL®), or polyether block amides (e.g. PEBAX®), or blends of these materials. The '831 patent also provides that the outer cover layer can be made from soft low modulus (i.e. 1000–10000 psi) material such as low-acid ionomers, ionomeric blends, non-ionomeric thermoplastic or thermosetting materials such as polyolefins, polyurethane (e.g. thermoplastic polyurethanes like TEXIN®, PELETHANE®, and thermoset polyurethanes like those disclosed in Wu, U.S. Pat. No. 5,334,673), polyester elastomer (e.g. HYTREL®), or polyether block amide (e.g. PEBAX®), or a blend of these materials.

Hebert, et al., U.S. Pat. No. 5,885,172 ("the '172 patent") discloses a multilayer golf ball giving a "progressive performance" (i.e. different performance characteristics when struck with different clubs at different head speeds and loft angles) and having an outer cover layer formed of a thermoset material with a thickness of less than 0.05 inches and an inner cover layer formed of a high flexural modulus material. The '172 patent provides that the outer cover is made from polyurethane ionomers as described in Wu, et al., U.S. Pat. No. 5,692,974, or thermoset polyurethanes such as TDI or methylenebis-(4-cyclohexyl isocyanate) ("HMDI"), or a polyol cured with a polyamine (e.g. methylenedianiline (MDA)), or with a trifunctional glycol (e.g., N,N,N',N'-tetrakis(2-hydroxpropyl)ethylenediamine). The '172 also provides that the inner cover has a Shore D hardness of 65–80, a flexural modulus of at least about 65,000 psi, and a thickness of about 0.020–0.045 inches. Exemplary materials for the inner cover are ionomers, polyurethanes, polyetheresters (e.g. HYTREL®), polyetheramides (e.g., PEBAX®), polyesters, dynamically vulcanized elastomers, functionalized styrene-butadiene elastomer, metallocene polymer, blends of these materials, nylon or acrylonitrile-butadiene-styrene copolymer.

Wu, U.S. Pat. No. 5,484,870 ("the '870 patent") discloses golf balls having covers composed of a polyurea composition. The polyurea composition disclosed in the '870 patent is a reaction product of an organic isocyanate having at least two functional groups and an organic amine having at least two functional groups. One of the organic isocyanates disclosed by the '870 patent is PPDI.

Although the prior art has disclosed golf ball covers composed of many different polyurethane materials, none of these golf balls have proven completely satisfactory. Dissatisfaction, for example, remains with processing and manufacturing the balls, especially with controlling the reaction time of the curative and prepolymer. If the "gel time" for formation of a polyurethane material is too fast, the time to place a core in a hemispherical cavity with the gelling pre-polyurethane material and to mate the hemispherical cavity with a corresponding hemispherical cavity is greatly reduced thereby leading to processing problems like air pockets, and centering of the core.

BRIEF SUMMARY OF THE INVENTION

The present invention is a more durable polyurethane material for a golf ball cover. The polyurethane material is formed from polytetramethylene ether glycol terminated 4,4'-dicyclohexyl methane diisocyanate-based polyurethane prepolymer and a curative blend composed of diethyl-2,4-toluene-diamine and a second curing agent having the same equivalent weight as 4,4'-methylenebis-(2,6-diethyl)-aniline. The equivalent weight of a compound is determined by dividing its molecular weight by the number of its functionality groups.

DETAILED DESCRIPTION OF THE INVENTION

Figure 1:
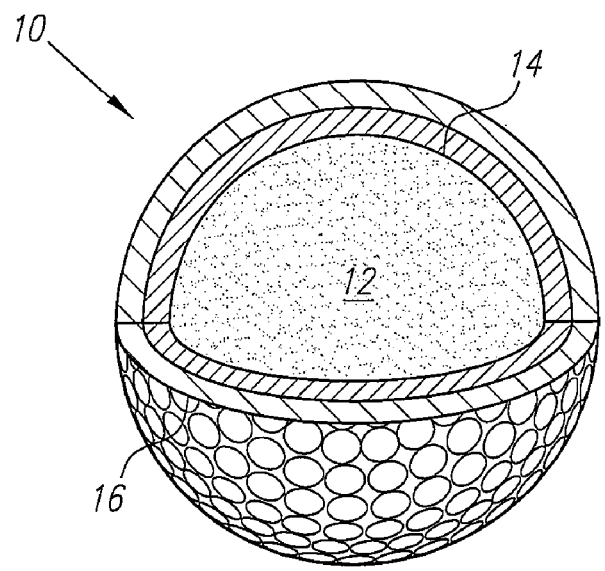
FIG. 1 illustrates a perspective view of a golf ball of the present invention including a cut-away portion showing a core, a boundary layer, and a cover.
Figure 2:
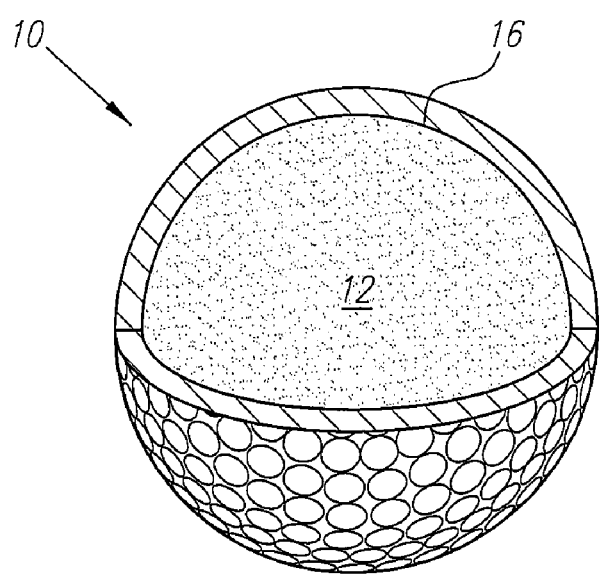
FIG. 2 illustrates a perspective view of a golf ball of the present invention including a cut-away portion core and a cover.

As illustrated in FIG. 1, a golf ball is generally indicated as 10. The golf ball 10 preferably includes a core 12, a boundary layer 14 and a cover 16. Alternatively, as shown in FIG. 2, the golf ball 10 may only include a core 12 and a cover 16. The cover 16 is composed of a thermosetting polyurethane material of the present invention. In a preferred embodiment, the cover 16 is formed over a boundary layer 14 and core 12, as shown in FIG. 1. Alternatively, the cover 16 is formed over the core 12, as shown in FIG. 2. Those skilled in the art will recognize that the core may be solid, hollow, multi-piece or liquid-filled, the boundary layer may be partitioned into additional layers, and the golf ball may have a wound layer without departing from the scope and spirit of the present invention.

The polyurethane material of the present invention is formed from reactants comprising at least one polyurethane prepolymer and a curative comprising a diethyl-2,4-toluene-diamine. The diethyl-2,4-toluene-diamine is preferably present in an amount of 25 to 75 parts per one hundred parts of the curative blend, more preferably 30 to 70 parts per one hundred parts of the curative blend, even more preferably 35 to 65 parts per one hundred parts of the curative blend, and most preferably 50 parts per one hundred parts of the curative blend. A preferred diethyl-2,4-toluene-diamine is available from Albemarle Corporation of Baton Rouge, La. under the tradename ETHACURE® 100 or EHTACURE® 100 LC.

A preferred second curative component of a curative blend used in a polyurethane material of the present invention is preferably N,N'-dialkylamino-diphenyl-methane. The N,N'-dialkylamino-diphenyl-methane is preferably present in an amount of 25 to 100 parts per one hundred parts of the curative blend, more preferably 25 to 75 parts per one hundred parts of the curative blend, yet more preferably 30 to 70 parts per one hundred parts of the curative blend, even more preferably 35 to 65 parts per one hundred parts of the curative blend, and most preferably 50 parts per one hundred parts of the curative blend. A preferred N,N'-dialkylamino-diphenyl-methane is available from UOP Company under the brand name UNILINK 4200.

The N,N'-dialkylamino-diphenyl-methane is an aromatic secondary diamine chain extender for polyurethane polymers, and it has a slower rate of reaction than conventional aromatic amines. When used in a curative blend, the N,N'-dialkylamino-diphenyl-methane slows the reaction and lowers the temperature of the reaction. The N,N'-dialkylamino-diphenyl-methane has an equivalent weight of 155, and a molecular weight of 310. The secondary diamine of the N,N'-dialkylamino-diphenyl-methane has a labile hydrogen and an alkyl group.

An alternative second curative is an aliphatic diamine. A preferred aliphatic diamine is available from UOP Company under the brand name Clearlink-1000.

The polyurethane prepolymer preferably uses a $H_{12}MDI$ based prepolymer, which includes an aliphatic based isocyanate. The polyurethane prepolymer is preferably a polytetramethylene ether glycol terminated 4,4'-dicyclohexyl methane diisocyanate-based polyurethane prepolymers. Preferred polytetramethylene ether glycol terminated 4,4'-dicyclohexyl methane diisocyanate-based polyurethane prepolymers are available from Uniroyal Chemical Company of Middlebury, Conn., under the tradename LW520 and LW570.

The ratio of the polyurethane prepolymer to curative is determined by the nitrogen-carbon-oxygen group ("NCO") content of the polyurethane prepolymer. For example, the NCO group content of the polytetramethylene ether glycol terminated 4,4'-dicyclohexyl methane diisocyanate-based polyurethane prepolymer is preferably in the range of 4.0% to 18.0%, more preferably in the range of 4.6.0% to 4.9%, and 7.35.0% to 7.65%.

In one embodiment, the polyurethane material is cast as a cover for a golf ball. In this embodiment, prior to curing, the polyurethane prepolymer and curative blend are preferably stored separately. In general, the polyurethane material is formed by first heating and mixing the curative blend. Then, the polyurethane prepolymer and the curative blend are mixed in a chamber. The mixture from the chamber is dispensed into a hemispherical cavity prior to insertion of a golf ball precursor product. The pre-polyurethane material is cured by applying heat and pressure for a predetermined time period. A more specific process is set forth below.

The polyurethane prepolymer is preferably degassed and warmed in a first holding container. The processing temperature for the polyurethane prepolymer is preferably in the range of about 70–130° F., and most preferably in the range of about 80–120° F. The polyurethane prepolymer is preferably flowable from the first holding container to a mixing chamber in a range of about 200–1100 grams of material per minute, or as needed for processing. In addition, the polyurethane prepolymer may be agitated in the first holding container, in the range of 0–250 rpm, to maintain a more even distribution of material and to eliminate crystallization.

The curative blend is degassed and warmed in a second holding container. The processing temperature for the curative blend is preferably in the range of about 50–230° F., and more preferably in the range of about 80–210° F., and most preferably in the range of about 170–190° F. The curative is preferably flowable from the second holding container to the mixing chamber in the range of about 15–75 grams of material per minute, or as needed. Additives may be added to the curative blend as desired.

The polyurethane prepolymer and curative blend are preferably added to the common mixing chamber at a temperature in the range of about 160–220° F. A colorant material, such as, for example, titanium dioxide, barium sulfate, and/or zinc oxide in a glycol or castor oil carrier, and/or other additive material(s) as are well known in the art, may be added to the common mixing chamber. The amount of colorant material added is preferably in the range of about 0–10% by weight of the combined polyurethane prepolymer and curative materials, and more preferably in the range of about 2–8%. Other additives, such as, for example, polymer fillers, metallic fillers, and/or organic and inorganic fillers (e.g. polymers, balata, ionomers, etc.) may be added as well to increase the specific gravity of the polyurethane material. The entire mixture is preferably agitated in the mixing chamber in the range of about 1 to 250 rpm prior to molding. A more detailed explanation of one aspect of the process is set forth in U.S. Pat. No. 6,200,512, entitled Golf Balls And Methods Of Manufacturing The Same, filed on Apr. 20, 1999, assigned to Callaway Golf Company, and which is hereby incorporated by reference in its entirety. A more detailed explanation of the casting system is set forth in U.S. Pat. No. 6,395,218, entitled Method For Forming A Thermoset Golf Ball Cover, filed on Feb. 1, 2000, assigned to Callaway Golf Company, and which is hereby incorporated by reference in its entirety.

In another embodiment, the polyurethane material of the present invention is reaction injection molded ("RIM") as a cover for a golf ball. RIM is a process by which highly reactive liquids are injected into a mold, mixed usually by impingement and/or mechanical mixing in an in-line device such as a "peanut mixer," where they polymerize primarily in the mold to form a coherent, one-piece molded article. The RIM process usually involves a rapid reaction between one or more reactive components such as a polyether polyol or polyester polyol, polyamine, or other material with an active hydrogen, and one or more isocyanate-containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, for example, 1,500 to 3,000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM. Further descriptions of suitable RIM systems is disclosed in U.S. Pat. No. 6,663,508, which pertinent parts are hereby incorporated by reference.

The core 12 of the present invention is preferably a single solid core such as disclosed in U.S. Pat. No. 6,612,940, assigned to Callaway Golf Company and which pertinent parts are hereby incorporated by reference, or such as disclosed in U.S. Pat. No. 6,465,546, also assigned to Callaway Golf Company and which pertinent parts are hereby incorporated by reference. However, alternative embodiments have a non-solid or multiple cores such as disclosed in U.S. Pat. No. 6,663,509, which pertinent parts are hereby incorporated by reference. In a preferred embodiment, the finished core 12 has a diameter of about 1.35 to about 1.64 inches for a golf ball 10 having an outer diameter of 1.68 inches. The core weight is preferably maintained in the range of about 32 to about 40 g. The core PGA compression is preferably maintained in the range of about 50 to 90, and most preferably about 55 to 80.

As used herein, the term "PGA compression" is defined as follows:

$$PGA\ compression\ value = 180 - Riehle\ compression\ value$$

The Riehle compression value is the amount of deformation of a golf ball in inches under a static load of 200 pounds, multiplied by 1000. Accordingly, for a deformation of 0.095 inches under a load of 200 pounds, the Riehle compression value is 95 and the PGA compression value is 85.

If the golf ball 10 has a boundary layer 14, the boundary layer 14 is preferably composed of a thermoplastic material. Suitable thermoplastic materials for the boundary layer 14 include: HYTREL® and/or HYLENE® products from DuPont, Wilmington, Del.; PEBAX® products from Elf Atochem, Philadelphia, Pa.; SURLYN® products from DuPont; and/or ESCOR® or IOTEK® products from Exxon Chemical, Houston, Tex.

In a preferred embodiment of the golf ball 10, the boundary layer 14 comprises a high acid (i.e. greater than 16 weight percent acid) ionomer resin or a blend of one or more high acid ionomers and one or more low acid ionomers (i.e. 16 weight percent acid or less)

The boundary layer 14 compositions of the embodiments described herein may include the high acid ionomers such as those developed by E. I. DuPont de Nemours & Company under the SURLYN brand, and by Exxon Corporation under the ESCOR or IOTEK brands, or blends thereof. Examples of compositions which may be used as the boundary layer 14 herein are set forth in detail in U.S. Pat. No. 5,688,869, which is incorporated herein by reference. The boundary layer 14 high acid ionomer compositions are not limited in any way to those compositions set forth in said patent. Those compositions are incorporated herein by way of examples only.

The high acid ionomers which may be suitable for use in formulating the boundary layer 14 compositions are ionic copolymers which are the metal (such as sodium, zinc, magnesium, etc.) salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (for example, iso- or n-butylacrylate, etc.) can also be included to produce a softer terpolymer. The carboxylic acid groups of the copolymer are partially neutralized (for example, approximately 10–100%, preferably 30–70%) by the metal ions. Each of the high acid ionomer resins which may be included in the inner layer cover compositions of the invention contains greater than 16% by weight of a carboxylic acid, preferably from about 17% to about 25% by weight of a carboxylic acid, more preferably from about 18.5% to about 21.5% by weight of a carboxylic acid. Examples of the high acid methacrylic acid based ionomers found suitable for use in accordance with this invention include, but are not limited to, SURLYN 8220 and 8240 (both formerly known as forms of SURLYN AD-8422), SURLYN 9220 (zinc cation), SURLYN SEP-503-1 (zinc cation), and SURLYN SEP-503-2 (magnesium cation). According to DuPont, all of these ionomers contain from about 18.5 to about 21.5% by weight methacrylic acid. Examples of the high acid acrylic acid based ionomers suitable for use in the present invention also include, but are not limited to, the high acid ethylene acrylic acid ionomers produced by Exxon such as Ex 1001, 1002, 959, 960, 989, 990, 1003, 1004, 993, and 994. In this regard, ESCOR or IOTEK 959 is a sodium ion neutralized ethylene-acrylic neutralized ethylene-acrylic acid copolymer. According to Exxon, IOTEKS 959 and 960 contain from about 19.0 to about 21.0% by weight acrylic acid with approximately 30 to about 70 percent of the acid groups neutralized with sodium and zinc ions, respectively.

Furthermore, as a result of the previous development by the assignee of this application of a number of high acid ionomers neutralized to various extents by several different types of metal cations, such as by manganese, lithium, potassium, calcium and nickel cations, several high acid ionomers and/or high acid ionomer blends besides sodium, zinc and magnesium high acid ionomers or ionomer blends are also available for golf ball cover production. It has been found that these additional cation neutralized high acid ionomer blends produce boundary layer 14 compositions exhibiting enhanced hardness and resilience due to synergies which occur during processing. Consequently, these metal cation neutralized high acid ionomer resins can be blended to produce substantially higher C.O.R.'s than those produced by the low acid ionomer boundary layer 14 compositions presently commercially available.

More particularly, several metal cation neutralized high acid ionomer resins have been produced by the assignee of this invention by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, incorporated herein by reference. It has been found that numerous metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (for example, from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the boundary layer 16 of the golf ball of the invention may be selected from the group consisting of vinyl esters of aliphatic carboxylic acids wherein the acids have 2 to 10 carbon atoms, vinyl ethers wherein the alkyl groups contain 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

The boundary layer 14 compositions may include the low acid ionomers such as those developed and sold by E. I. DuPont de Nemours & Company under the SURLYN and by Exxon Corporation under the brands ESCOR and IOTEK, ionomers made in-situ, or blends thereof.

Another embodiment of the boundary layer 14 comprises a non-ionomeric thermoplastic material or thermoset material. Suitable non-ionomeric materials include, but are not limited to, metallocene catalyzed polyolefins or polyamides, polyamide/ionomer blends, polyphenylene ether/ionomer blends, etc., which preferably have a Shore D hardness of at least 60 (or a Shore C hardness of at least about 90) and a flex modulus of greater than about 30,000 psi, preferably greater than about 50,000 psi, or other hardness and flex modulus values which are comparable to the properties of the ionomers described above. Other suitable materials include but are not limited to, thermoplastic or thermosetting polyurethanes, thermoplastic block polyesters, for example, a polyester elastomer such as that marketed by DuPont under the brand HYTREL, or thermoplastic block polyamides, for example, a polyether amide such as that marketed by Elf Atochem S. A. under the brand PEBEX, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

The Shore D hardness of the boundary layer 14 preferably ranges from 40 to 75, as measured according to ASTM D-2290. In a most preferred embodiment, the boundary layer 14 has a Shore D hardness in the range of 50–65. One reason for preferring a boundary layer 14 with a Shore D hardness of 75 or lower is to improve the feel of the resultant golf ball. It is also preferred that the boundary layer 14 is composed of a blend of SURLYN® ionomer resins.

One preferred formulation for the boundary layer 14 has 25–50 weight percent SURLYN 8150, 25–50 weight percent SURLYN 9150, and 25–50 weight percent SURLYN 6320. Another formulation for the boundary layer 14 has 25–75 weight percent SURLYN 9150, and 25–75 weight percent SURLYN 6320. Those skilled in the pertinent art will recognize that other ionomers may be utilized for the optional boundary layer 14 without departing from the scope and spirit of the present invention. The Shore D hardness of the boundary layer 14 is preferably 50 to 75, more preferably from 55–65 Shore D, and most preferably 58–63 Shore D, as measured according to ASTM-D2240.

The polyurethane material of the present invention preferably has a Shore D hardness ranging from 30 to 60 as measured according to ASTM-D2240, more preferably 40 to 55 Shore D, and most preferably 50 Shore D.

A preferred formulation for the polyurethane material of the present invention is a polytetramethylene ether glycol terminated 4,4'-dicyclohexyl methane diisocyanate polyurethane prepolymer (NCO group content of 7.5%), a curative blend comprising diethyl-2,4-toluene-diamine in an amount of 25 to 75 parts per one hundred parts of the curative blend and an aliphatic diamine in an amount of 25 to 75 parts per one hundred parts of the curative blend, and 1 to 10 parts of a triol such as trimetholyipropane ("TMP").

Another preferred formulation for the polyurethane material of the present invention is polytetramethylene ether glycol terminated 4,4'-dicyclohexyl methane diisocyanate polyurethane prepolymer (NCO group content of 7.5%), a curative blend comprising diethyl-2,4-toluene-diamine in an amount of 50 parts per one hundred parts of the curative blend and N,N'-dialkylamino-diphenyl-methane in an amount of 50 parts per one hundred parts of the curative blend, and 3 parts TMP.

Another preferred formulation for the polyurethane material of the present invention is an ester terminated 4,4'-dicyclohexyl methane diisocyanate polyurethane prepolymer (NCO group content of 7.5%), a curative blend comprising diethyl-2,4-toluene-diamine in an amount of 50 parts per one hundred parts of the curative blend and an aliphatic diamine in an amount of 50 parts per one hundred parts of the curative blend.

Another preferred formulation for the polyurethane material of the present invention is polytetramethylene ether glycol terminated 4,4'-dicyclohexyl methane diisocyanate polyurethane prepolymer (NCO group content of 7.5%), a curative blend comprising diethyl-2,4-toluene-diamine in an amount of 50 parts per one hundred parts of the curative blend and an aliphatic diamine in an amount of 50 parts per one hundred parts of the curative blend.

The preferred construction of a golf ball 10 utilizing the polyurethane material of the present invention is a three-piece solid golf ball having a solid polybutadiene core 12, a boundary layer 14 composed of a blend of ionomers, and a cover 16 composed of the polyurethane material of the present invention. The core 12 is preferably compression molded, the boundary layer 14 is preferably injection molded, and the cover 16 is preferably cast or reaction injection molded. The golf ball 10 may be finished with one or two layers of a base white coating, a clear coating and an indicia.

The thickness of the cover 16 preferably ranges from 0.010 inch to 0.070 inch, more preferably ranges from 0.014 inch to 0.050 inch, even preferably ranges from 0.015 inch to 0.044 inch, most preferably ranges from 0.020 inch to 0.030 inch, and is most preferably 0.025 inch. The boundary layer 14 is preferably injection molded and preferably ranges in thickness from 0.040 inch to 0.090 inch, more preferably from 0.045 inch to 0.070 inch, and most preferably from 0.050 inch to 0.060 inch. The boundary layer 14 may also be compression molded from half shells. The core 12 preferably has a diameter of between 1.35 inches and 1.60 inches, more preferably between 1.45 inches and 1.55 inches, and most preferably 1.49 inches. The core 12 preferably has a PGA compression ranging from 70–110 points, and most preferably 100 points. A more detailed description of a construction and performance properties of a golf ball utilizing the polyurethane material of the present invention is set forth in U.S. Pat. No. 6,443,858, for a Golf Ball With A High Coefficient Of Restitution, issued on Sep. 2, 2002, assigned to Callaway Golf Company, and U.S. Pat. No. 6,478,697 for a Golf Ball With A High Coefficient Of Restitution, filed on Nov. 12, 2002, assigned to Callaway Golf Company, both of which are hereby incorporated by reference in their entireties.

The Shore D hardness of the golf ball 10, as measured on the golf ball, is preferably between 30 Shore D points to 75 Shore D points, and most preferably between 50 Shore D points and 65 Shore D points. The hardness of the golf ball 10 is measured using an Instron Shore D Hardness measurement device wherein the golf ball 10 is placed within a holder and the pin is lowered to the surface to measure the hardness. The average of five measurements is used in calculating the ball hardness. The ball hardness is preferably measured on a land area of the cover 14. The preferred overall diameter of the golf ball 10 is approximately 1.68 inches, and the preferred mass is approximately 45.5 grams. However, those skilled in the pertinent art will recognize that the diameter of the golf ball 10 may be smaller (e.g. 1.65 inches) or larger (e.g. 1.70 inches) without departing from the scope and spirit of the present invention. Further, the mass may also vary without departing from the scope and spirit of the present invention.

The surface geometry of the golf ball 10 is preferably a conventional dimple pattern such as disclosed in U.S. Pat. No. 6,213,898 for a Golf Ball With An Aerodynamic Surface On A Polyurethane Cover, which pertinent parts are hereby incorporated by reference. Alternatively, the surface geometry of the golf ball 10 may have a non-dimple pattern such as disclosed in U.S. Pat. No. 6,290,615 filed on Nov. 18, 1999 for A Golf Ball Having Tubular lattice Pattern, which pertinent parts are hereby incorporated by reference.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

What is claimed is:

1. A golf ball comprising:
    a core; and
    a cover formed over the core, the cover composed of a thermosetting polyurethane material formed from reactants comprising a polytetramethylene ether glycol terminated 4,4'-dicyclohexyl methane diisocyanate polyurethane prepolymer and a curative blend comprising diethyl-2,4-toluene-diamine and N,N'-dialkylamino-diphenyl-methane;
    wherein the cover has an aerodynamic surface geometry thereon.

2. The golf ball according to claim 1 further comprising at least one boundary layer disposed between the core and the cover.

3. The golf ball according to claim 2 wherein the boundary layer is composed of a blend of ionomers.

4. A golf ball comprising:
    a core; and
    a cover formed over the core, the cover composed of a thermosetting polyurethane material formed from reactants comprising a polytetramethylene ether glycol terminated 4,4'-dicyclohexyl methane diisocyanate polyurethane prepolymer and a curative blend comprising diethyl-2,4-toluene-diamine and an aliphatic diamine wherein the cover has an aerodynamic surface geometry thereon.

5. A golf ball comprising:
    a core comprising a polybutadiene mixture;
    a boundary layer formed over the core; and
    a cover formed over the boundary layer, the cover composed of a thermosetting polyurethane material formed from reactants comprising a polytetramethylene ether glycol terminated 4,4'-dicyclohexyl methane diisocyanate polyurethane prepolymer and a curative blend comprising diethyl-2,4-toluene-diamine in an amount of 50 parts per one hundred parts of the curative blend and an aliphatic diamine in an amount of 50 parts per one hundred parts of the curative blend;

wherein the cover has an aerodynamic surface geometry thereon.

6. A golf ball comprising:

a core comprising a polybutadiene mixture;

a boundary layer formed over the core; and a cover formed over the boundary layer, the cover composed of a thermosetting polyurethane material formed from reactants comprising a polytetramethylene ether glycol terminated 4,4'-dicyclohexyl methane diisocyanate polyurethane prepolymer and a curative blend comprising diethyl-2,4-toluene-diamine in an amount of 50 parts per one hundred parts of the curative blend and N,N'-dialkylamino-diphenyl-methane in an amount of 50 parts per one hundred parts of the curative blend;

wherein the cover has an aerodynamic surface geometry thereon.

7. The golf ball according to claim 5 wherein the cover has a thickness ranging from 0.020 inch to 0.030 inch.

8. A golf ball comprising:

a core comprising a polybutadiene mixture, the core having a diameter ranging from 1.35 inches to 1.64 inches and having a PGA compression ranging from 50 to 90;

a boundary layer formed over the core, the boundary layer composed of a blend of ionomer materials, the boundary layer having a thickness ranging from 0.020 inch to 0.075 inch, the blend of ionomer materials having a Shore D hardness ranging from 50 to 75 as measured according to ASTM-D2240; and a cover formed over the boundary layer, the cover composed of a thermosetting polyurethane material formed from reactants comprising a 4,4'-dicyclohexyl methane diisocyanate polyurethane prepolymer and a curative blend comprising diethyl-2,4-toluene-diamine in an amount of 50 parts per one hundred parts of the curative blend and an aliphatic diamine in an amount of 50 parts per one hundred parts of the curative blend, wherein the thermosetting polyurethane material has a Shore D hardness ranging from 30 to 60 as measured according to ASTM-D2240, a thickness ranging from 0.020 inch to 0.030 inch, and an aerodynamic surface geometry thereon.

9. A golf ball comprising:

a core comprising a polybutadiene mixture, the core having a diameter ranging from 1.35 inches to 1.64 inches and having a PGA compression ranging from 50 to 90;

a boundary layer formed over the core, the boundary layer composed of a blend of ionomer materials, the boundary layer having a thickness ranging from 0.020 inch to 0.075 inch, the blend of ionomer materials having a Shore D hardness ranging from 50 to 75 as measured according to ASTM-D2240; and a cover formed over the boundary layer, the cover composed of a thermosetting polyurethane material formed from reactants comprising a 4,4'-dicyclohexyl methane diisocyanate polyurethane prepolymer and a curative blend comprising diethyl-2,4-toluene-diamine in an amount of 50 parts per one hundred parts of the curative blend and N,N'-dialkylamino-diphenyl-methane in an amount of 50 parts per one hundred parts of the curative blend, wherein the thermosetting polyurethane material has a Shore D hardness ranging from 30 to 60 as measured according to ASTM-D2240, a thickness ranging from 0.020 inch to 0.030 inch, and an aerodynamic surface geometry thereon.

10. The golf ball according to claim 8 wherein the cover is reaction injection molded.

11. The golf ball according to claim 8 wherein the cover is cast.

\* \* \* \* \*